Feb. 13, 1951   B. M. LANG   2,541,523
VEHICLE MOUNTED MATERIAL HANDLING APPARATUS
Filed Dec. 3, 1948   2 Sheets-Sheet 1
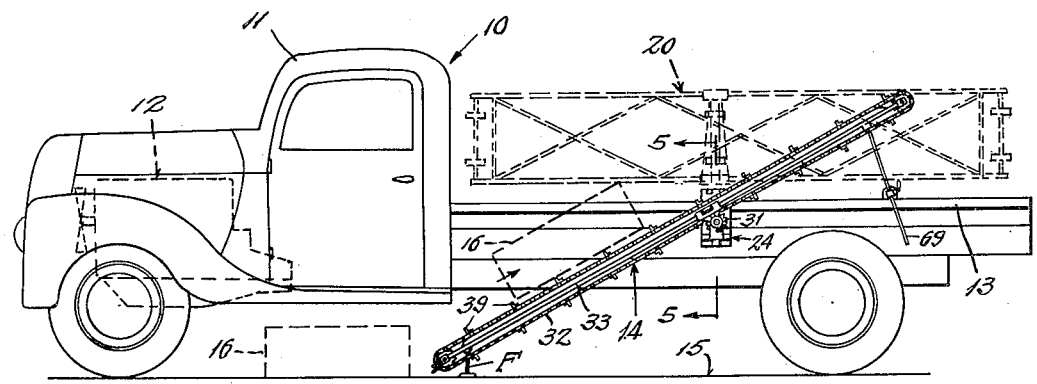
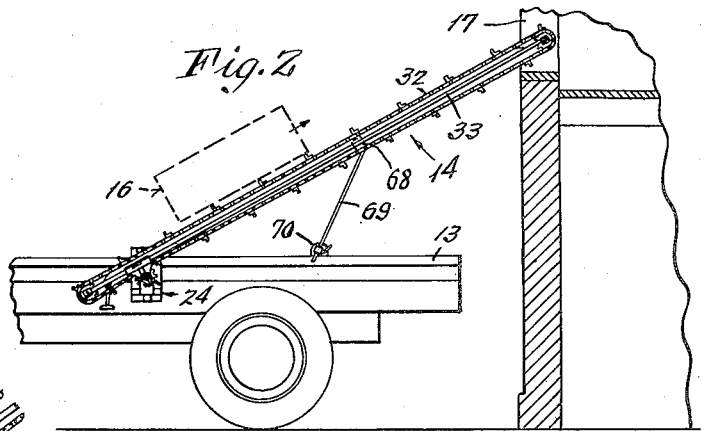
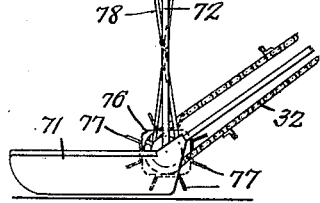
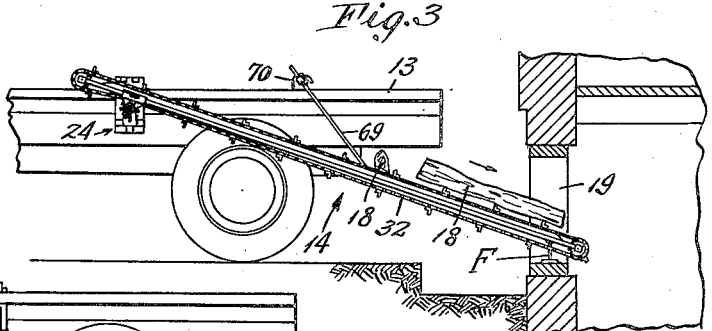
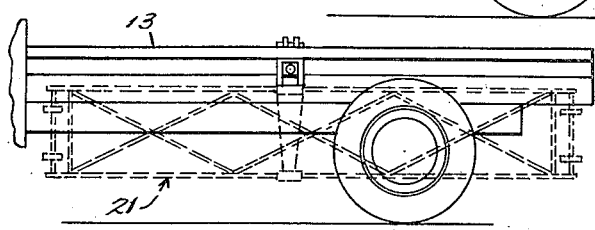
Inventor
Boris M. Lang
By
Johnson and Kline
Attorneys

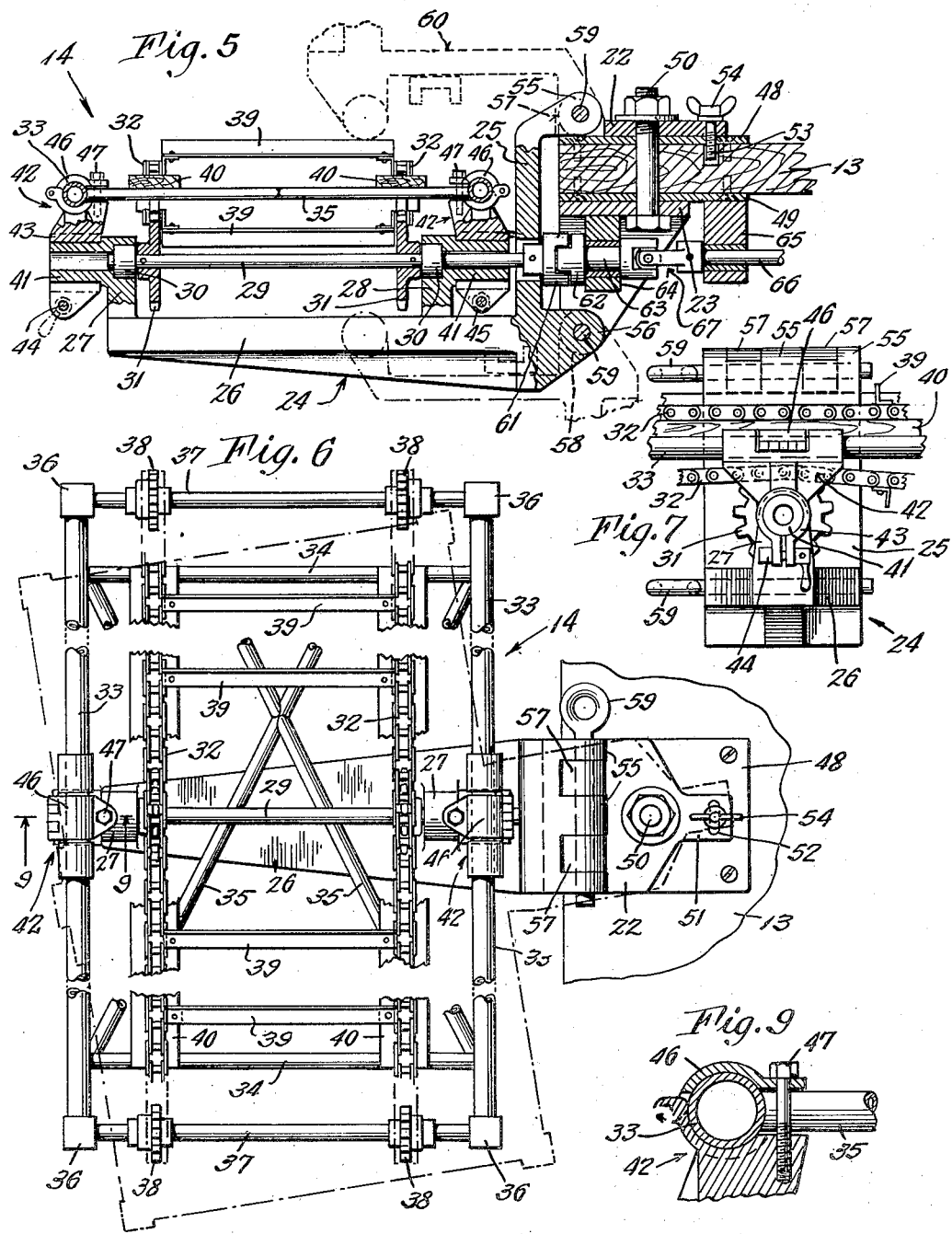

Patented Feb. 13, 1951

2,541,523

UNITED STATES PATENT OFFICE 2,541,523

VEHICLE MOUNTED MATERIAL HANDLING APPARATUS

Boris M. Lang, New Preston, Conn.

Application December 3, 1948, Serial No. 63,240

5 Claims. (Cl. 214—83.16)

This invention relates to material handling apparatus, and more particularly to a combination vehicle and loading and unloading means therefor.

The specific embodiment of the invention shown and described herein as illustrative thereof, comprises a combination farm truck and loading and unloading means, so arranged that bales of hay, sacks of grain, cordwood, kindling wood and other farm materials or packages may be readily handled with a minimum of labor; however it should be understood that the invention has utility in connection with the handling of other types of materials, as for example products of manufacture in industrial plants, coal, snow, etc.

In successful farming, labor costs must be kept low, as a rule, and consequently devices which will save or eliminate labor are of considerable importance. The handling and moving of heavy and bulky objects such as bales of hay, bags of feed, logs or cut wood, and the transporting of this material from one place to another has in the past generally required the services of a number of hired hands, and has involved a substantial amount of hard labor. For example, if bales of hay are to be picked up from a field and stored in a barn, the bales would have to be lifted and stacked on a truck by hand, and then when the truck has reached its destination they would again have to be handled and lifted to store them, this latter often involving carrying of the bales to a high and dry place in the barn, as in the loft.

If cut wood is to be stored at a point remote from the place of cutting, the wood would have to be lifted and placed on the truck, then transported, and finally again lifted and carried from the truck to store it.

An object of the present invention is to provide an improved apparatus whereby such handling of bales of hay or cut wood, for instance, may be very quickly and conveniently accomplished with a minimum of labor being required, thereby resulting in considerable savings in time and labor, and greatly reducing the cost of such operations.

In accomplishing this object there is provided, in the specific illustrative embodiment shown herein, a novel combination vehicle or truck and material handling means, the said means being in the form of a power conveyor which is preferably driven from the vehicle engine. The conveyor is mounted on and carried by the vehicle adjacent a platform or body thereof, by a unique support means whereby it may be placed in a large number of different operative positions to enable it to perform mechanically the loading and unloading operations heretofore requiring hand labor, and to enable it also to be used in raising materials from the vehicle body or platform, to a loft window, for example.

The material handling or conveyor means per se may be of any usual type, such as that having an elongate rigid frame carrying at its end pulleys or sprockets over which belts or chains pass. However, in the example of the invention shown, the frame of the conveyor is mounted in guides carried at one side of the vehicle or truck body, in which guides the conveyor frame may be slid longitudinally to enable it to occupy a large number of different longitudinal positions.

Also, the guides are pivotally carried by a heavy frame member to swing about a horizontal axis transverse to the truck body and the frame member is in turn pivotally or hingedly connected with the truck body to swing about a second horizontal axis generally at right angles to the first. As a result of these pivotal or hinged connections, in combination with the slidable connection between the guides and the conveyor frame, the conveyor may be made to occupy various useful operative positions, and also inoperative or storage positions. For example, it may be made to extend from a point near the ground alongside of the truck body, upward past the side of the body and substantially above the latter. When so positioned, the conveyor may be operated either with the truck at a standstill or slowly moving, to pick up bales or other objects on the ground and to deliver them to a point above the truck body where they may be readily slid off the conveyor and onto the body. Or if the truck is backed against a barn, the conveyor may be made to extend from the truck body upward to a point adjacent the loft window of the barn, and therefore objects on the truck may be delivered by power to the barn loft. Also, the conveyor may be made to extend from the level of the truck body downward to the rear thereof whereby objects on the body may be delivered to the ground level at a point to the rear of the truck. Thus cut wood, for example, may be conveniently transferred from the truck through a cellar window, into the cellar of a house.

In the embodiment of the invention illustrated herein, a double hinge connection is provided between the conveyor supporting frame and the truck, the connection having removable pins and being so arranged that when one pin is removed the conveyor may be swung inward and upward, and when the other pin is removed the conveyor may be swung inward and downward, in each case to a storage position extending alongside the truck body.

Simple and effective means are provided whereby the conveyor may be secured or locked in its various adjusted operative positions, quickly and conveniently.

Other features and advantages will hereinafter appear.

In the accompanying drawings:

Figure 1 is a side elevational view of the improved combined vehicle and material handling means of the invention, the material handling means being shown in one operative position.

Fig. 2 is a fragmentary side elevational view showing the material handling means in another operative position.

Fig. 3 is another fragmentary side elevational view showing the material handling means in still a third operative position.

Fig. 4 is a fragmentary side elevational view showing the material handling means in dotted outline, swung inward and downward to a storage position.

Fig. 5 is a vertical sectional view taken on line 5—5 of Fig. 1, through the supporting means or bracket for the material handling means or conveyor.

Fig. 6 is a condensed plan view of the conveyor and supporting means therefor.

Fig. 7 is a fragmentary side elevational view, enlarged, of the outer end of the bracket or support means for the conveyor.

Fig. 8 is a fragmentary side elevational view of the lower portion of the conveyor, illustrating a modification of the invention providing an improved automatic pickup, and Fig. 9 is a fragmentary sectional view taken on line 9—9 of Fig. 6.

Referring to Fig. 1, the improved material handling apparatus of the invention comprises a vehicle 10, shown as a farm truck, having a cab 11, engine 12 and truck body 13. The truck 10 has the usual power take-off mechanism (not shown) which is driven from the truck engine 12, whereby various devices requiring power for their operation may be employed to perform useful tasks.

In accordance with the present invention, an elevating belt conveyor 14 is provided, mounted on and combined with the truck 10 in such a manner that it may be powered thereby from the power take-off mechanism, and is adjustable and operable throughout a wide variety of positions to enable material, packages, bundles, etc., to be quickly and easily loaded on the truck from the ground or higher levels, and thereafter unloaded from the truck to levels either higher or lower than the level of the truck body. The conveyor 14 is, according to the invention, both pivotally and slidably carried at an edge portion of the truck body whereby it may be adjustably moved about a horizontal pivot and also adjustably shifted lengthwise when in my pivotal position, and may be driven from the truck engine 12 by means of the power take-off mechanism thereof, when in any adjusted or shifted position.

Thus it may be made to perform a wide variety of different, advantageous labor saving operations. For example, in Fig. 1 the conveyor 14 is shown extending angularly downward and forward from the center portion of the truck body 13, reaching to a point closely adjacent the ground 15. When the conveyor is so positioned, material resting on the ground, as for example bale 16, may be fed to the conveyor 14 and carried one at a time to a level above the body 13 of the truck, whereupon they may be removed by a person standing on the truck body, and readily stacked thereon.

When, after the truck body 13 has been loaded, it is desired to unload the truck and deliver the material to a higher level, this may be readily done by shifting the conveyor 14 lengthwise to the position shown in Fig. 2, whereupon it will be able to transport and lift the bales 16 or other material, and deliver the same to a loft window 17 for example.

If desired, the conveyor 14 may be shifted or swung downward from the position of Fig. 2 to the position of Fig. 3, wherein it can deliver material from the truck body 13, as the fire wood 18, to a cellar window 19.

Moreover, by means of the novel mounting provided between the conveyor 14 and truck body 13, the conveyor may be swung inward from the outswung operative positions of Figs. 1, 2 and 3, either upward to a storage position 20 shown in dotted outline in Fig. 1, or downward to a storage position 21 shown in dotted outline in Fig. 4.

The novel and improved mounting means by which the conveyor 14 may be shifted and swung to the various operative and inoperative positions shown in Figs. 1 through 4 is shown in detail in Figs. 5, 6, 7 and 8. This mounting means comprises essentially a three-part bracket consisting of an upper plate 22 and a lower plate 23 respectively mounted on the top and bottom of the body or platform 13, and an L-shaped supporting arm 24 having a normally vertically disposed base portion 25 and a normally horizontally disposed carrier portion 26.

The carrier portion 26 of the supporting arm 24 has a pair of uprights 27 and 28 which are bored to receive a shaft 29 rotatably carried in bearings 30 mounted in the uprights. The shaft 29 receives power from the vehicle engine 12 by means of a drive mechanism to be described hereinafter in detail, and carries sprockets 31 engageable with chains 32 of the conveyor 14 whereby the chains are driven in response to turning of the shaft 29.

It is intended that the term "belt conveyor" as used herein and applied to the conveyor 14, be generic and include all the various types of continuous belt-like conveying devices and mechanisms such as chains, canvas and rubber belts, wire mesh belts, etc., whether these have cleats, buckets or other auxiliary carrying devices or are plain, without such devices, since obviously the invention is not limited to the specific type of conveyor but has utility with various different types.

The conveyor 14, Figs. 5 and 6, is here shown as having a rigid rectangular frame formed of oppositely-placed, longitudinally-extending rigid tubes 33 connected together at intervals by transverse struts 34, and reinforced by crossed diagonal struts 35. At their ends the tubular frame members 33 carry bearing fittings 36 in which bear shafts 37 having sprockets 38 over which the conveyor chains 32 pass.

At intervals along their lengths the conveyor chains 32 are connected together by transverse angle members 39. The top portions of the chains 32 are carried along tracks consisting of wooden strips 40, which are bolted to the frame struts 34 and 35 of the conveyor.

While the conveyor 14 is shown and described herein as having chains and sprockets, these may be readily replaced by end pulleys and a belt, or by other equivalent devices, and hereinafter the term "pulley" is intended to have a generic meaning and to include the sprockets 38 and equivalent devices, as well as smooth pulleys or drums, etc.

In accordance with the invention, the conveyor 14 is pivotally mounted on the supporting arm 24 of the bracket assemblage, for pivotal movement about a horizontal axis extending transverse to the truck body 13, and for lengthwise sliding movement when in any adjusted pivotal position.

To accomplish this, the uprights 27 of the carrier portion 26 of the bracket are provided with lateral extensions or trunnions 41 which rotatably carry fittings 42 having split-sleeve portions 43 encompassing the trunnions 41.

Referring to Fig. 5, the left hand fitting 42 has a swivel-head clamping bolt 44, and the right hand fitting 42 has an hexagonal nut and bolt 45, by which the split sleeve portions of the fittings 42 may be tightened on the trunnions 41 in any adjusted, rotative positions.

The fittings 42, above the portions 43, have split sleeves 46 extending at right angles to the sleeve portions 43. The sleeves 46 are each formed of two parts, hingedly connected together as shown, the parts being adapted to receive the tubular frame members 33 of the conveyor 14, and to be clamped on said members by means of cap screws 47.

By this construction, if it is desired, the upper parts of the sleeves 46 may be swung away to release the frame members 33 upon removal of the cap screws 47, and thus the entire conveyor 14 may be removed as a unit from the supporting arm 24 of the bracket assemblage. Also, when it is desired to shift the conveyor 14 lengthwise, if the struts 34 and 35 are obstructed by the cap screws 47, the latter may be temporarily removed until the conveyor is in the desired lengthwise shifted position, whereupon they may be replaced and tightened to hold the conveyor against further movement.

It will be understood, as shown in Fig. 7, that the sprockets 31 engage the lower portions of the chains 32 and thereby drive the chains, regardless if the pivotal or lengthwise shifted positions of the conveyor 14.

By the organization described above, the conveyor 14 may be pivotally moved and also shifted lengthwise to assume any of a large number of different operative positions, three of which are shown in Figs. 1, 2 and 3 respectively, whereby it may aid considerably in the handling of material. It may be used with relatively large packages or bundles, as shown in Figs. 1 or 2, or with smaller articles such as the cut wood shown in Fig. 3. The conveyor, when properly equipped with a suitable belt and cleats, may also be advantageously used in connection with snow removal, or for the handling of materials such as coal, stone and gravel, etc.

In accordance with the present invention, the bracket assemblage comprising the parts 22, 23 and 24 is carried on the truck body 13 so as to have a limited pivotal movement about a vertical axis.

In accomplishing this, the upper and lower faces of the truck body 13 are provided with face plates 48 and 49 respectively, and the bracket parts 22 and 23 are secured to this assemblage by a single large pivot bolt 50. The upper bracket part 22 has an extension 51 provided with an arcuate slot 52 receiving a stud 53 secured to the top face plate 48, the stud having a wing nut 54 threaded onto it whereby the bracket part 22 may be clamped to the face plate 48 in different adjusted positions, using the bolt 50 as a pivot. In Figure 6 an angular position of the conveyor 14, after it has been shifted about the pivot bolt 50, is shown by dotted outline.

According to the invention, means are provided whereby the conveyor 14 and supporting arm 24 of the bracket assemblage may be swung inward either upward or downward along pivotal axes extending longitudinally of the truck body, to enable the conveyor to be stored in either a raised inswung position as shown in Fig. 1, or a lowered inswung position as shown in Fig. 4. In accomplishing this, the base portion 25 of the supporting arm 24 is provided with a plurality of aligned eyes 55 and a second plurality of aligned eyes 56, which are respectively cooperable with aligned eyes 57 and 58 on the upper and lower bracket parts 22 and 23. Pivot pins 59 normally extend through the sets of eyes of the bracket parts, thereby locking the supporting arm 24 of the bracket assemblage against any movement whatsoever with respect to the upper and lower bracket parts 22 and 23. However, if the lower pivot pin should be withdrawn, the supporting arm 24 may be swung upward together with the entire conveyor 14, the base portion 25 of the bracket of the supporting arm occupying the dotted-line position 60 shown in Fig. 1. Or, the upper pivot pin 59 may be withdrawn, thereby enabling the supporting arm 24 to be swung downward with the conveyor 14, about the lower pivot pin 59 so that the conveyor may occupy the lowered inswung position shown in Fig. 4.

For the purpose of providing an effective and simplified drive between the shaft 29 and power take-off mechanism (not shown) of the vehicle, which drive will be operable for all operative positions of the conveyor 14, the shaft 29 which carries the sprockets 31 is extended through the base portion 25 of the bracket assemblage, and is provided with a clutch head 61 which is cooperable with a complementary separable clutch head 62 of a shaft 63 carried in a bearing post 64 depending from the bracket part 23. A second depending bearing post 65 is provided, carried on the lower face plate 49, and the shaft 66 is journaled in said bearing post and is connected to the shaft 63 by a universal joint 67. The shaft 66 derives its power from the power take-off of the vehicle, mentioned above.

It will be noted that the universal joint 67 is located directly below the pivot bolt 50, thereby enabling the conveyor 14 and bracket supporting arm 24 to be swung about the pivot bolt 50 without interferring with the power supplied to the shaft 29.

Whenever one of the pivot pins 59 is withdrawn and the conveyor 14 swung inward either up or down, the clutch head 61 will separate from the complementary head 62, as clearly indicated in Fig. 5.

One of the tubular frame members 33 of the conveyor, preferably that nearest to the truck body 13, may carry a fitting 68 pivotally connected with a strut member 69 which latter may be secured in a fitting 70 on the truck body, as shown in Figs. 1, 2 and 3. The fitting 68 is made slidable along the tubular frame member 33 whereby the strut 69 may be utilized to support the conveyor in its different adjusted positions. The conveyor will also be supported against shifting by tightening of the bolts 44 and 45 on the trunnions 41, and by tightening of the cap screws 47 on the side rails 33 of the conveyor, as will be understood. The ends of the conveyor frame may be provided with feet F pivotally connected thereto, for engagement with supporting surfaces as shown in Figs. 1 and 3, to further support the conveyor when in operative position.

Thus it is seen that by the present invention an extremely efficient and effective material handling apparatus is provided. The vehicle 10 may be driven to various locations where material is to be handled, and may be readily located to dispose the conveyor 14 in a favorable position to most conveniently receive and handle the material. The conveyor 14 may be shifted about the horizontal axis represented by the trunnions 41, and may also be shifted lengthwise to enable it to either raise material above the level of the truck body 13 from the ground, or to carry material from the truck body level either to higher or lower levels. A slight amount of pivotal adjustment may also be had about the pivot bolt 50 to further facilitate the proper handling of the material, and when it is desired to transport material by means of the truck, the conveyor 14 may be swung either upward or downward to a storage position, where it does not extend any appreciable distance beyond the side of the truck body.

A modification of the invention is shown in Fig. 8. The conveyor 14 as shown may be provided with a forwardly extending guide arm 71 at its lowermost end, and extending from said end may have uprights 72 carrying a shaft 73 on which there is mounted a feeding drum 74 provided with projections or lugs 75. The shaft 37 at the lower end of the conveyor may have a square drum 76 provided with projections 77, and the spacing between the drums 76 and 74 may be so adjusted that they cooperate to automatically feed a package, such as a bale of hay or the like, onto the conveyor 14 as the vehicle 10 is moved slowly forward, the arm 71 guiding the bale inward to a proper position directly in front of the pickup drum 76. The upper drum may be powered by a belt 78, driven from the lower conveyor shaft 37.

Variations and modifications may be made within the scope of this invention and portions of the improvements may be used without others.

I claim:

1. Apparatus for handling material, comprising a vehicle having power means for propelling it along the ground, and having a platform, raised a substantial distance above the ground and adapted to support and carry material; an elongate belt conveyor having end pulleys over which the belt passes, and having a length substantially greater than the distance from the platform to the ground; means mounting the conveyor on the vehicle adjacent an edge of the platform for adjusting pivotal movement in opposite directions about a horizontal axis, the axes of the conveyor pulleys being substantially parallel to said axis, said means including means mounting the conveyor for pivotal movement about a second horizontal axis substantially at right angles to the first horizontal axis, the conveyor being pivotally movable by virtue of said latter means between an outswung operative position and an upswung storage position; a slide connection between said mounting means and conveyor enabling the latter to be adjustably shifted lengthwise when in any adjusted pivotal position; and means driving the conveyor from said power means for all adjusted positions of the conveyor when in outswung operative position whereby the conveyor may be positioned and utilized, first to raise material from the ground level to the platform, and then from the platform level either to higher or lower levels.

2. Apparatus for handling material, comprising a vehicle having power means for propelling it along the ground, and having a platform, raised a substantial distance above the ground and adapted to support and carry material; an elongate belt conveyor having end pulleys over which the belt passes, and having a length substantially greater than the distance from the platform to the ground; means mounting the conveyor on the vehicle adjacent an edge of the platform for adjusting pivotal movement in opposite directions about a horizontal axis, the axes of the conveyor pulleys being substantially parallel to said axis, said means including means mounting the conveyor for pivotal movement about a second horizontal axis substantially at right angles to the first horizontal axis, the conveyor being pivotally movable by virtue of said latter means between an outswung, operative position and a downswung storage position; a slide connection between said mounting and conveyor, enabling the latter to be adjustably shifted lengthwise when in any adjusted pivotal position; and means driving the conveyor from said power means for all adjusted positions of the conveyor when in outswung operative position whereby the conveyor may be positioned and utilized, first to raise material from the ground level to the platform, and then from the platform level either to higher or lower levels.

3. Apparatus for handling material, comprising a vehicle having power means for propelling it along the ground, and having a platform, raised a substantial distance above the ground and adapted to support and carry material; an elongate belt conveyor having end pulleys over which the belt passes, and having a length substantially greater than the distance from the platform to the ground; means mounting the conveyor on the vehicle adjacent an edge of the platform for adjusting pivotal movement in opposite directions about a horizontal axis, the axes of the conveyor pulleys being substantially parallel to said axis, said means including means mounting the conveyor for pivotal movement about a second horizontal axis substantially at right angles to the first horizontal axis, the conveyor being pivotally movable by virtue of said latter means between either an upswung or downswung storage position and an outswung operative position; a slide connection between said mounting and conveyor, enabling the latter to be adjustably shifted lengthwise when in any adjusted pivotal position; and means driving the conveyor from said power means for all adjusted positions of the conveyor when in outswung, operative position whereby the conveyor may be positioned and utilized, first to raise material from the ground level to the platform, and then from the platform level either to higher or lower levels.

4. Apparatus for handling material, comprising a truck having an engine and having a body the floor of which is located a substantial distance off the ground; an elongate belt conveyor having end pulleys over which the belt passes, and having a length substantially greater than the distance from the said floor to the ground; a mounting bracket; means securing said bracket to the truck adjacent an edge portion of the truck body, for pivotal movement about a horizontal axis extending substantially longitudinally of the truck whereby the bracket may be supported in an outswung or an inswung storage position; means mounting said conveyor on the bracket for pivotal adjusting movement about a horizontal axis extending substantially transverse to the truck when the bracket is projecting, the axes of the conveyor pulleys being substantially parallel to said horizontal axis, said means including means slidably mounting the conveyor on the bracket for lengthwise adjusting movement when in any pivotal position; a shaft passing through said bracket; means driving the conveyor belt from said shaft; and means driving the shaft from the truck engine when the bracket is in outswung operative position, said means including a clutch having separable parts becoming disengaged when the bracket is in inswung storage position.

5. Apparatus for handling material, comprising a vehicle having power means for propelling it along the ground, and having a platform, raised a substantial distance above the ground and adapted to support and carry material; an elongate belt conveyor having end pulleys over which the belt passes, and having a length substantially greater than the distance from the platform to the ground; means mounting the conveyor on the vehicle adjacent an edge of the platform for adjusting pivotal movement in opposite directions about a horizontal axis, the axes of the conveyor pulleys being substantially parallel to said axis, said means including means providing for adjustable pivotal movement about a vertical axis, and including means mounting the conveyor for pivotal movement about a second horizontal axis substantially at right angles to the first horizontal axis, the conveyor by virtue of said latter means being pivotally movable between an outswung, operative position and an inswung storage position; a slide connection between said mounting and conveyor, enabling the latter to be adjustably shifted lengthwise when in any adjusted pivotal position; and means driving the conveyor from said power means for all adjusted positions of the conveyor when in outswung, operative position whereby the conveyor may be positioned and utilized first to raise material from the ground level to the platform and then from the platform level either to higher or lower levels.

BORIS M. LANG.

REFERENCES CITED

The following references are of record in the file of this patent:

UNITED STATES PATENTS

| Number | Name | Date |
| --- | --- | --- |
| 1,073,376 | Vivian | Sept. 16, 1913 |
| 1,419,381 | Humphreys et al. | June 13, 1922 |
| 1,853,253 | Bennett | Apr. 12, 1932 |
| 2,304,249 | Erickson | Dec. 8, 1942 |
| 2,381,780 | Simons | Aug. 7, 1945 |
| 2,389,779 | Heller | Nov. 27, 1945 |
| 2,484,689 | Davis | Oct. 11, 1949 |

FOREIGN PATENTS

| Number | Country | Date |
| --- | --- | --- |
| 480,668 | Germany | Aug. 7, 1929 |